US012688399B2

(12) United States Patent
Urdaneta et al.

(10) Patent No.: US 12,688,399 B2
(45) Date of Patent: Jul. 21, 2026

(54) RATE OF PENETRATION FORECASTING WHILE DRILLING USING A TRANSFORMER-BASED DEEP LEARNING MODEL

(71) Applicant: Schlumberger Technology Corporation, Sugar Land, TX (US)

(72) Inventors: Carlos Urdaneta, Houston, TX (US); Cheolkyun Jeong, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 171 days.

(21) Appl. No.: 18/807,136

(22) Filed: Aug. 16, 2024

(65) Prior Publication Data

US 2025/0061309 A1 Feb. 20, 2025

Related U.S. Application Data

(60) Provisional application No. 63/520,442, filed on Aug. 18, 2023.

(51) Int. Cl.
*G06N 3/0455* (2023.01)
*E21B 45/00* (2006.01)
*E21B 21/08* (2006.01)
*E21B 47/04* (2012.01)

(52) U.S. Cl.
CPC .......... *G06N 3/0455* (2023.01); *E21B 45/00* (2013.01); *E21B 21/08* (2013.01); *E21B 47/04* (2013.01)

(58) Field of Classification Search
CPC ....... G06N 3/0455; E21B 45/00; E21B 21/08; E21B 47/04; E21B 44/00; E21B 2200/20; E21B 2200/22; E21B 47/10
See application file for complete search history.

(56) References Cited

U.S. PATENT DOCUMENTS

| | | | |
|---|---|---|---|
| 2014/0110167 A1 | 4/2014 | Goebel | |
| 2019/0108460 A1* | 4/2019 | Chien | .................. G06Q 10/063 |
| 2019/0345809 A1 | 11/2019 | Jain | |
| 2020/0040719 A1* | 2/2020 | Maniar | ................... E21B 41/00 |
| 2022/0170359 A1* | 6/2022 | Boualleg | ............... G06N 20/20 |

(Continued)

OTHER PUBLICATIONS

Singh, Kriti, et al. "From science to practice: improving ROP by utilizing a cloud-based machine-learning solution in real-time drilling operations." SPE/IADC Drilling Conference and Exhibition. SPE, 2021. (Year: 2021).*

(Continued)

*Primary Examiner* — Chuen-Meei Gan
(74) *Attorney, Agent, or Firm* — Jeffrey D. Frantz

(57) ABSTRACT

A method for forecasting a rate of penetration while drilling includes training a transformer-based machine learning model with historical drilling data obtained from a plurality of drilled wells to establish relationships between measured drilling parameters and ROP; acquiring short context drilling data while drilling the subterranean wellbore, the short context drilling data including a plurality of measured drilling parameters and a corresponding ROP; evaluating the short context drilling data using the trained transformer-based machine learning model to update the relationships between the measured drilling parameters and the ROP; and forecasting a future ROP using the short context drilling data and the updated relationships.

19 Claims, 5 Drawing Sheets

(56) References Cited

U.S. PATENT DOCUMENTS

| 2022/0268144 | A1 | 8/2022 | Al-Abduljabbar |
| 2022/0307365 | A1 | 9/2022 | Al-Abduljabbar |
| 2023/0175380 | A1 | 6/2023 | Aljubran |

OTHER PUBLICATIONS

Nash et al., Utah Forge: Logs and Data from Deep Well 58-32 (MU-ESW1), (2018). Retrieved from: https://gdr. openei.org/submissions/1006.

Bristol et al., Utah Forge: Well 56-32 Drilling Data and Logs (2021), Retrieved from: https://gdr.openei.org submissions/1295.

McLennan, J., Utah Forge: Well 78B-32 Daily Drilling Reports and Logs (2021), Retrieved from: https://gdr.openei.org/submissions/1330.

McLennan et al., Utah Forge: Well 16A(78)-32 Drilling Data (2021), Retrieved from: https://gdr.openei.org/submissions/1283.

\* cited by examiner

100

| Train Transformer-Based Machine Learning Model | 102 |
| Input Short Context Data into Trained Model | 104 |
| Modify Correlations Established While Training | 106 |
| Forecast ROP | 108 |
| Adjust Drill Parameters to Change ROP | 110 |

Encoder    Decoder

RATE OF PENETRATION FORECASTING WHILE DRILLING USING A TRANSFORMER-BASED DEEP LEARNING MODEL

CROSS REFERENCE TO RELATED APPLICATIONS

This application claims priority to and the benefit of U.S. Provisional Application No. 63/520,442, filed on Aug. 18, 2023, the entirety of which is incorporated herein by reference.

BACKGROUND

Improving or otherwise controlling the rate of penetration (ROP) can be important to a successful drilling operation. For example, geothermal energy is a renewable source of energy that relies on drilling wells into challenging formations characterized by high temperatures. The unique challenges of geothermal drilling require optimization of the drilling process to keep costs low. In such geothermal drilling operations, improving the ROP is important to enhance the drilling efficiency and reduce drilling expenses. Improving and controlling ROP is also important to oilfield exploration and production drilling operations.

Numerous studies have been conducted over the years to optimize drilling operations and predict ROP. One difficulty is that the ROP depends on a large number of drilling parameters and conditions. For example, the ROP may depend upon drilling parameters such as weight on bit, drill string rotation rate, torque, drilling fluid flow rate, the type, configuration, and wear of the drill bit, as well as various properties of the wellbore and formation being drilled such as the wellbore diameter, rock hardness, and the formation fracture strength. Moreover, ROP has been found to sometimes undergo variations that occur at regular intervals that may be related to longer-term drilling conditions (e.g., on the order of minutes). Such seasonality is not well understood.

In recent years, machine learning models have been used to predict ROP. While the use of such models has had limited success, there is room for further improvement. In particular, there is a need in the industry for improved prediction accuracy and to better predict ROP over both the near term and longer terms.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Embodiments of this disclosure include systems and methods for estimating/predicting ROP. One example method includes training a transformer-based machine learning model with historical drilling data obtained from a plurality of drilled wells to establish relationships between measured drilling parameters and ROP; acquiring short context drilling data while drilling the subterranean wellbore, the short context drilling data including a plurality of measured drilling parameters and a corresponding ROP; evaluating the short context drilling data using the trained transformer-based machine learning model to update the relationships between the measured drilling parameters and the ROP; and forecasting a future ROP using the short context drilling data and the updated relationships.

Figure 1:
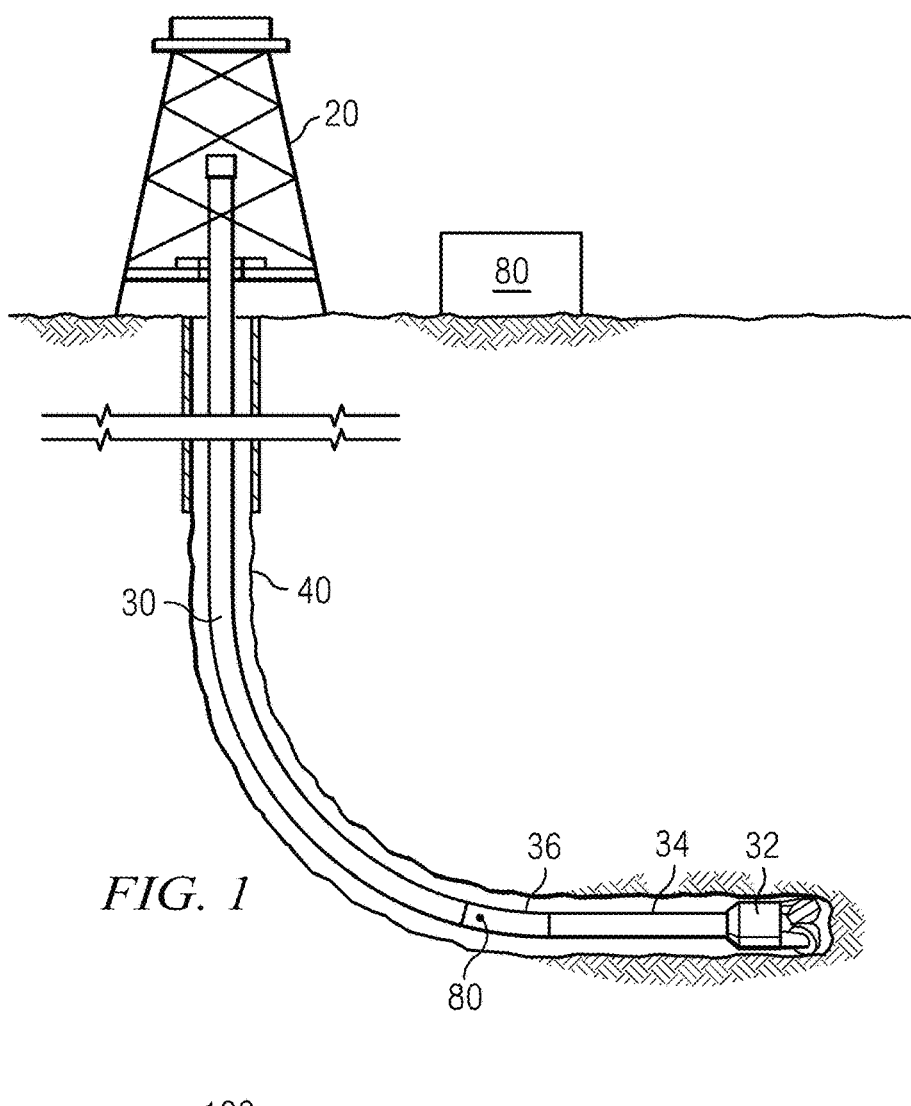
FIG. 1 depicts an example drilling rig including an example system for estimating ROP.

FIG. 1 depicts an example drilling rig 20 including a system 80 for predicting the ROP. The drilling rig 20 may be positioned over a subterranean formation (not shown) and may be configured for drilling a geothermal well or a hydrocarbon exploration and/or production well. The rig 20 may include, for example, a derrick and a hoisting apparatus (also not shown) for raising and lowering a drill string 30, which, as shown, extends into wellbore 40 and includes, for example, a drill bit 32, a steering tool 34 (such as a rotary steerable tool), and a measurement while drilling (MWD) tool 36. In this type of system, the wellbore 40 may be formed in the subsurface formations by rotary drilling in a manner that is well-known to those or ordinary skill in the art (e.g., via well-known directional drilling techniques). Those of ordinary skill in the art given the benefit of this disclosure will appreciate, however, that the present invention also finds application in drilling applications other than conventional rotary drilling (e.g., mud-motor based directional drilling), and is not limited to land-based rigs.

As is known to those of ordinary skill, the drill string 30 may be rotated, for example, at the surface to drill the well (e.g., via a rotary table). A pump may deliver drilling fluid to the interior of the drill string 30 thereby causing the drilling fluid to flow downwardly through the drill string 30. The drilling fluid exits the drill string 30, e.g., via ports in a drill bit 32, and then circulates upwardly through the annulus region between the outside of the drill string 30 and the wall of the wellbore 40. In this known manner, the drilling fluid lubricates the drill bit 32 and carries formation cuttings up to the surface.

Various sensors are located about the wellsite to collect data related to the drilling operation, such as standpipe pressure, pump pressure, hook load, wellbore depth, surface torque, rotary rpm, among others. The drill string may also include downhole sensors disposed in the drill bit, the steering tool 34, the MWD tool 36, or a logging while drilling (LWD) tool to provide information about downhole conditions, such as wellbore pressure, weight on bit, torque on bit, wellbore heading or attitude (inclination and azimuth), collar rpm, tool temperature, annular temperature, and toolface, among others. These sensors (both uphole and downhole) may be configured to provide data to the system 80 for predicting the ROP.

With continued reference to FIG. 1, in example embodiments, the system 80 may be deployed at the rig site (e.g., in an onsite laboratory as depicted) or offsite. Moreover, in certain advantageous embodiments (as described in more detail below), the system 80 may be deployed in the drill string, for example, in the MWD tool 36 as depicted. The disclosed embodiments are, of course, not limited in this regard. The system 80 may include computer hardware and software configured to automatically or semi-automatically receive and evaluate the drilling and wellbore parameters to estimate the ROP. To perform these functions, the hardware may include one or more processors (e.g., microprocessors) which may be connected to one or more data storage devices (e.g., hard drives or solid state memory). As is known to those of ordinary skill, the processors may be further connected to a network, e.g., to receive the various sensor data from networked sensors) or another computer system. The system 80 may be further configured to receive a trained machine learning model. It will be further understood that the disclosed embodiments may include processor executable instructions stored in the data storage device. The executable instructions may be configured, for example, to execute methods 100, 120, 140, and 170 to predict the ROP as described in more detail below. It will, of course, be understood that the disclosed embodiments are not limited to the use of or the configuration of any particular computer hardware and/or software.

Figures 2A, 2B, 2C:
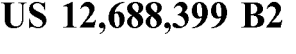
FIGS. 2A, 2B, and 2C (collectively FIG. 2) depict plots of ROP versus weight on bit (WOB), torque, and drill string rotation rate (RPM) for a drilling operation.

Accurately predicting the ROP during a drilling operation is challenging. As noted above in the background section, the ROP can depend on a number of drilling and formation parameters. Moreover, the relationship to these numerous parameters is often non-linear and may be interactive (meaning that particular drilling parameters may interact with one another to generate a nonlinear ROP response). FIGS. 2A, 2B, and 2C (collectively FIG. 2) depict plots of ROP in units of feet per hour versus WOB in units of klbs (2A), torque in units of klb-ft (2B), and drill string rotation rate in units of revolutions per minute (2C) for an example drilling operation. Note that the relationships between ROP and WOB, torque, and RPM are highly nonlinear with a large scatter. Moreover, the ROP was observed to depend on the wellbore depth (and therefore time) during the operation.

In some drilling operations a mechanical specific energy (MSE) may be used as an indicator of the rate of penetration. It will be appreciated by those of ordinary skill in the art that MSE is a measure of drilling efficiency and is the energy required to remove a unit volume of subterranean rock. To improve or optimize drilling efficiency, a common objective is to minimize the MSE and to maximize the ROP. One example MSE may be expressed mathematically, for example, as follows:

$$MSE = \frac{480 \cdot T \cdot RPM}{D_{bit}^2 \cdot ROP} + \frac{4 \cdot WOB}{\pi \cdot D_{bit}^2}$$

where T represents the torque, RPM represents the rotation rate of the drill bit, $D_{bit}$ represents the diameter of the drill bit, ROP represents the rate of penetration of drilling, and WOB represents the weight on bit. While the foregoing equation may provide an acceptable indication of ROP in some drilling operations, there is room for further improvement. For example, the ROP can be influenced by many drilling and formation parameters not included in the above equation (such as the pressure gradient ahead of the bit, the degradation of the drill bit, the compressibility of the rock, etc.). Moreover, the ROP has been found to undergo variations that occur at regular intervals in some operations (such cyclical variation is sometimes referred to as seasonality although it not generally related to will be understood that it is not related to the astronomical seasons).

Those of ordinary skill in the art will readily appreciate that more elaborate, empirically based ROP models have been developed. For example, the Motahhari ROP model may be expressed mathematically, for example, as follows:

$$ROP = W_f \left( \frac{G \cdot RPM^{\gamma} \cdot WOB^{\alpha}}{D_{bit}^2 \cdot S} \right)$$

where $W_f$ represents a drill bit wear parameter that depends on WOB and other drilling factors, G represents a model drillability coefficient, and S represents a confined rock strength. The coefficients $\alpha$ and $\gamma$ represent empirically derived model exponents. While the Motahhari ROP model can, in some operations, account for more parameters that influence ROP (e.g., via the model drillability coefficient and the empirically derived model exponents), parameters remain that are not included in the model. Moreover, such empirical models are not generally able to account for or predict ROP variations that occur at regular intervals. There is a need in the industry for improved prediction accuracy and to better predict ROP over both the near and longer terms during a drilling operation.

Figure 3:
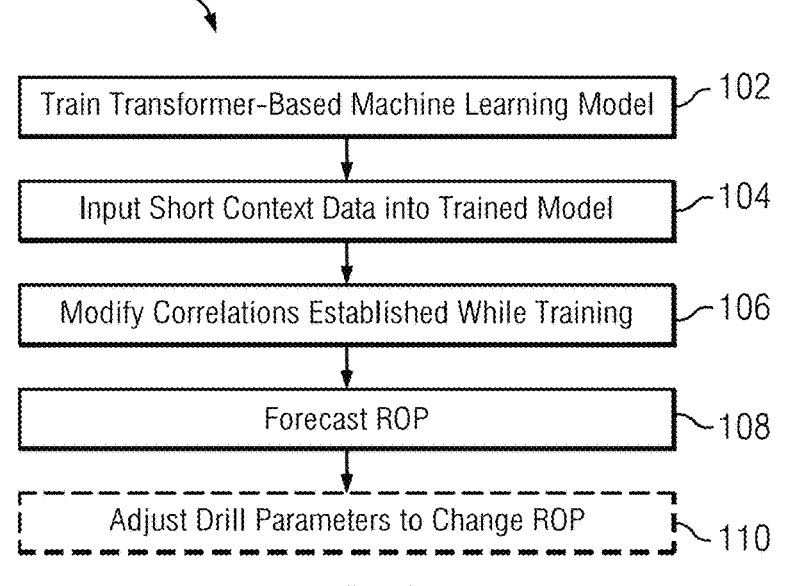
FIG. 3 depicts a flowchart of one example method for predicting ROP.

FIG. 3 depicts a flowchart of one example method 100 for predicting ROP during a drilling operation. Method 100 includes training a transformer-based machine learning model with historical drilling data at 102 to obtain a trained model. The historical drilling data may include substantially any suitable drilling data, for example, from a number of previously drilled wells and may include a large number of drilling and formation parameters as well as the corresponding target ROP parameter. The training may include identifying relationships and/or correlations between the historical drilling data and the corresponding target ROP. Such training generally requires significant computing power is often performed off-site (e.g., at computing facilities that are not on the rig site). However, the disclosed embodiments are not limited in this regard.

Short context, time series drilling data may be input into the trained model at 104. The short context drilling data may be acquired, for example, from the well being drilled or from a recently drilled well in the same field (e.g., in the same geological location) or from the same pad. The time series data may include substantially any suitable measurements made while drilling including, for example, weight on bit, drill string rotation rate, standpipe pressure, rotary torque, wellbore depth, and the corresponding ROP, as described in more detail below.

A transformer-based encoder may be used to evaluate short context time series data at 106 to modify the relationships and/or correlations established during training (in 102) or may be used to identify particular ones of the relationships and/or correlations that are most relevant to the current drilling operation. A transformer-based or feed-forward based decoder evaluates the modified or identified relationships and/or correlations from the encoder as well as the drilling parameter profile from the short context, time series drilling data to make a time series prediction (forecast) of the ROP at 108. Method 100 may further optionally include adjusting one or more of the drilling parameters to change or adjust the ROP at 110. For example, the WOB, RPM, or drilling fluid flow rate may be adjusted to increase or decrease the ROP.

Figures 4A, 4B:
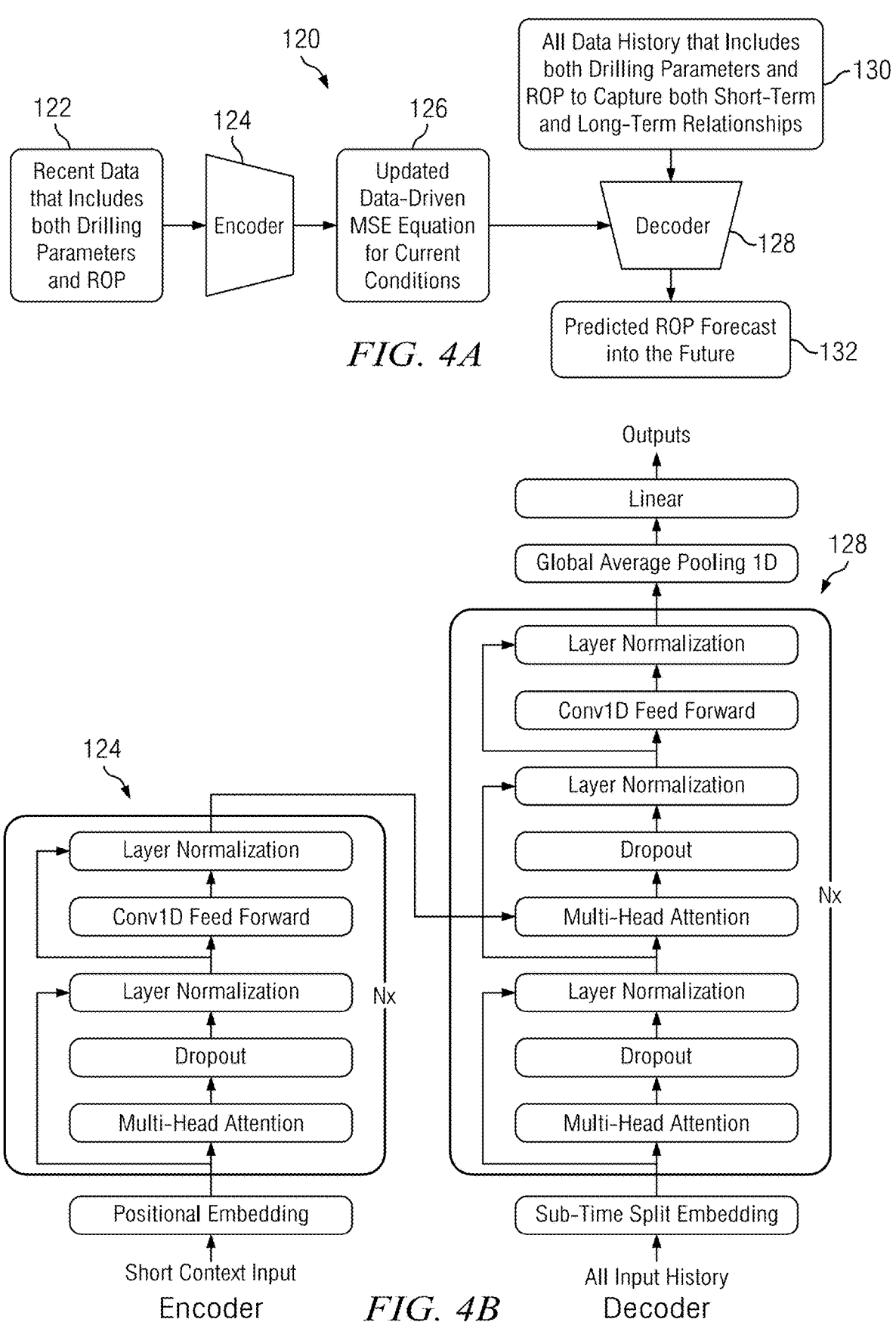
FIGS. 4A and 4B (collectively FIG. 4) depict a block diagram/flowchart of another example method for predicting ROP.

FIGS. 4A and 4B (collectively FIG. 4) depict a block diagram of another example method 120 for predicting ROP during a drilling operation. Method 120 is similar to method 100 in that short context, time series drilling data may be received at 122 and input into a trained model encoder 124. The short context, time series data may include recent data that includes both drilling parameters and the corresponding ROP. The trained encoder may be trained using historical data, for example, as described above with respect to method 100. As also described above the trained encoder may evaluate the short context time series drilling parameters and the corresponding ROP to identify or modify relationships and/or correlations between the drilling parameters and the ROP. For example, the encoder may update a data-driven (empirical) MSE equation that pertains specifically to the current drilling conditions as indicated at 126.

With continued reference to FIG. 4A, the encoder output may be input into a trained transformer-based decoder at 128. The trained decoder may be configured to forecast a future ROP at 132 based on the encoder output and the full data history used to capture both short-term and long-term relationships between the drilling parameters and the ROP 130 and thereby train the decoder. For example, the decoder may be configured to predict the ROP for a short time interval into the future, such as one minute, five minutes, 10 minutes, or 20 minutes into the future. While not explicitly depicted on FIG. 4A, it will be understood that 122, 124, 126, 128, and 132 may be repeated while drilling to continually update the predicted ROP as drilling progresses. For example, these steps may be repeated at some predetermined time interval (such as a 5, 10, or 20-minute interval). It will be appreciated that the disclosed embodiments are, of course, not limited to any particular time intervals.

With continued reference to FIGS. 3 and 4, the transformer architecture may be configured to predict the relationship between the selected drilling parameters and the ROP. The encoder may be configured to extract data-driven mechanical specific energy (MSE) related information for a local well (such as the particular well being drilled) from the context data. In one example embodiment described in more detail below, the context data may be configured (and provided to the encoder) as a tensor with a context length representing a short, preselected time window. The encoded output may be the result of a first self-attention layer and captures information about the MSE required to optimize ROP for the particular well being drilled, such as the rock strength, the bit design efficiency, and the pressure gradient ahead of the bit. This information may then be used to configure the decoder for making predictions.

The decoder may be configured to generate the ROP predictions from the received drilling parameters profile (including other wells) and to may make use of both self-attention and cross-attention mechanisms and the relationships established by the encoder. For example, the primary task of the decoder may be to predict the ROP trajectory based on the input drilling parameters profile and the information provided by the encoder. Owing to the computational complexity associated with long input sequences, the drilling parameter profile may be divided into smaller sub-time series. As described in further detail below, each sub-time series may be treated as a separate token, which may then be projected using a linear layer. A positional embedding may be added to these tokens. As noted above, the decoder may perform both self-attention and cross-attention. The self-attention processes the input sequence, while the cross-attention involves attending over the encoder's output. The final output of the decoder includes a sequence of tokens representing ROP predictions. These tokens are reshaped to form a one-dimensional time series representing the predicted ROP curve.

With continued reference to FIGS. 3 and 4, it will be appreciated that the drilling data may include a large number of drilling parameters. For example, the drilling data may include at least standpipe pressure (the pressure of the drilling fluid in the standpipe), the drilling fluid flow rate or percentage of max flow rate, rotary torque (e.g., as measured at the top drive or downhole), borehole depth, a weight on bit or hook load, and a drill string or top drive rotation rate. Additional drilling conditions may include, for example, a drilling or rig mode, a drill bit and/or drill string configuration, pump pressure, and rates of drilling fluid flow into and out of the borehole. The drilling data may further include various formation properties including, for example, GammaRay counts and resistivity such as 2 MHz and 400 kHz resistivity. The drilling data may further include various borehole conditions including, for example, the drill bit diameter, the wellbore attitude including the azimuth and inclination, the total vertical depth of the borehole, and differential pressure and temperature. The drilling data may further include substantially any other surface measurements made on the rig or downhole measurements made in the drill string.

With still further reference to FIG. 4B, the disclosed embodiments may make use of first and second, encoder and decoder transformer-based architectures. A first architecture (the encoder) focuses on regression, leveraging a transformer-based encoder and a feed-forward dense decoder to extract an up-to-date relationship between drilling operational parameters and ROP. In the example encoder architecture depicted the ROP transformer regressor guides the selection of drilling parameters, such as the optimal WOB and RPM to achieve an optimal ROP. The second example architecture (the decoder) may be configured to forecast ROP using a transformer-based encoder and a transformer-based decoder. The ROP transformer-based decoder captures sequential patterns and establishes longer-term relationships between drilling parameters and ROP. By proactively forecasting ROP, a drilling engineer may be able to make informed choices about the use of certain drilling parameters before ROP drops to an unacceptable level.

Figures 5, 6:
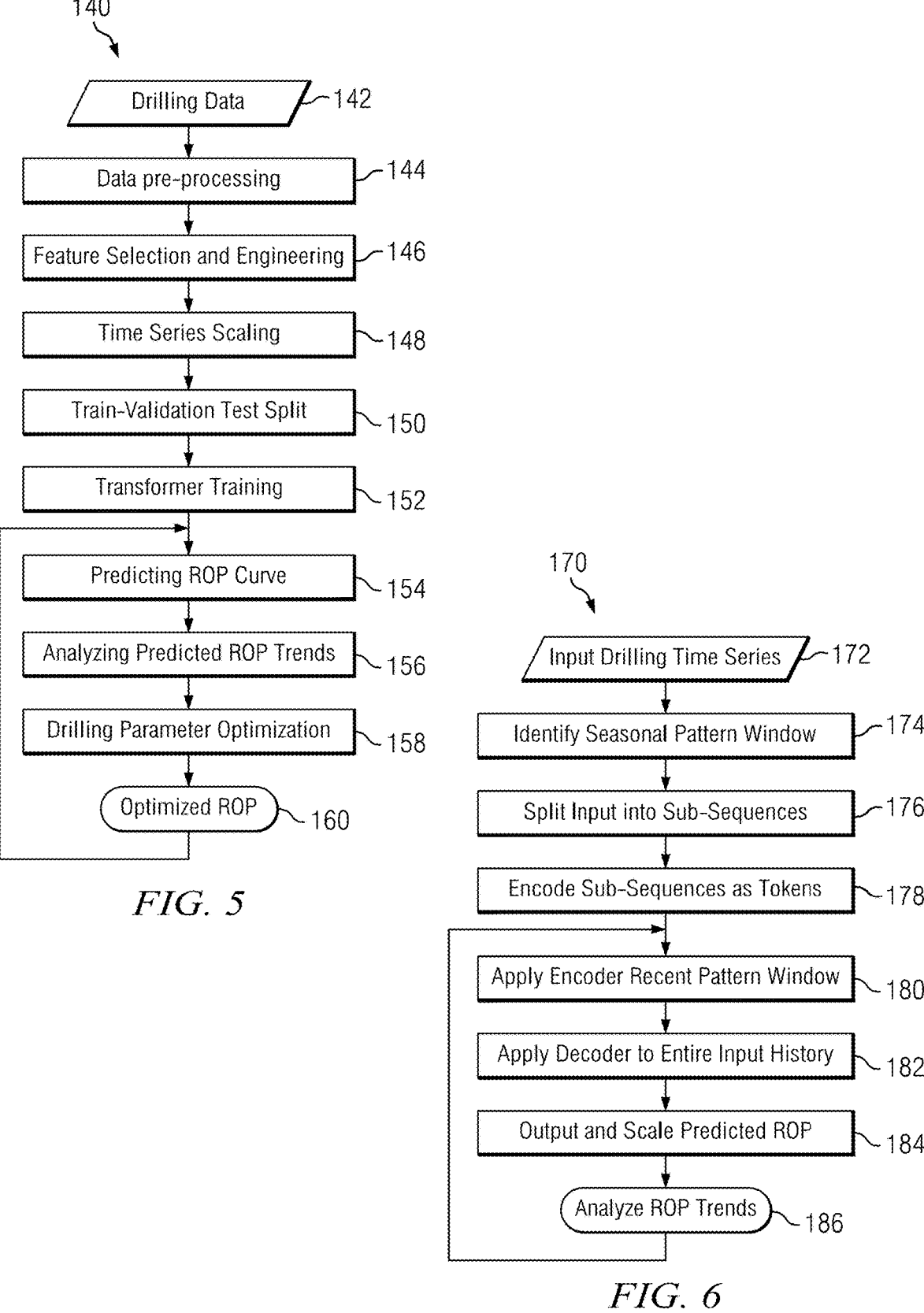
FIG. 5 depicts a flowchart of still another example method for predicting ROP.
FIG. 6 depicts a flow chart of an example method for identifying ROP variations that occur at regular time intervals.

FIG. 5 depicts a flow chart of another example method 140 for predicting ROP during a drilling operation and is similar to methods 100 and 120 described above. Drilling data is received at 142. The received data may be pre-processed at 144, for example, to clean, normalize, format, and fill in missing data from within the received drilling data. The pre-processed data is evaluated at 146, for example, to select the data that is most relevant to ROP production. The selection may further include generating linear or polynomial combinations of particular measurements. In example embodiments the combinations may include one or more of the following: (i) the sum of depth and WOB, (ii) the product of depth and torque, (iii) the product of differential pressure in the drilling fluid flow rate into the wellbore, (iv) the product of the drill string rotation rate and torque, and (v) the product of the drill string rotation rate and differential pressure.

With continued reference to FIG. 5, the pre-processed data and selected features may be rescaled in time at 148, for example, via computing a moving average or data resampling. The scaled data may then be used to train and validate the transformer-based machine learning model at 150 and 152. For example, the data may be split into a training subset and a validation subset at 150 and then used to train the transformer-based machine learning model at 152. As described above, the training may include identifying relationships and/or correlations between the drilling data and the target ROP. The training and validation may further include tuning model hyper parameters and optimizing to achieve the lowest MAPE. The training and validation may further include minimizing the number of features required to accurately predict the ROP. In one example embodiment, such training results in a trained encoder/decoder model as described above with respect to FIGS. 3 and 4.

Short context drilling data may be received and evaluated at 154 to predict identify relevant ROP relationships in the well being drilled and to predict an ROP forecast, for example, as described above. The prediction may further include a backtest in which a previous ROP forecast is compared with current ROP data. At 156, predicted ROP trends are evaluated, for example, by a drilling engineer or by an automated routine, to determine relationships and/or correlations between the actual and predicted ROP. Drilling parameters may in turn be selected or optimized at 158 to change and/or optimize the ROP while drilling 160. The ROP forecasting may be repeated as indicated at substantially any suitable time interval while drilling to forecast and optimize the ROP during the drilling operation.

Turning now to FIG. 6, a flow chart of a method 170 for identifying ROP variations that occur at regular time intervals is depicted. The method receiving or inputting drilling data at 172. Such data may include historical data, for example, as described above. The data may be evaluated at 174 to identify seasonal patterns within the data (by seasonal it is meant regular time intervals over which the ROP varies or repeats). The patterns may be identified, for example, via computing correlations over a number of repeating time windows. These patterns may be further evaluated to identify and select a time window. The selected time window may be substantially any suitable length of time, however, is generally a time window that occurs many times over the course of a drilling operation, such as five, 10, 20, or 30 minute intervals. The disclosed embodiments are, of course, not limited to any particular time interval.

With continued reference to FIG. 6, data may be split into a plurality of window length sub sequences (also referred to herein as patches) at 176. These patches may be encoded as tokens at 178 using the transformer architecture, for example, via translation into an appropriate structure for the transformer-based in learning model. The transformer's encoder structure, with stacked self-attention and fully connected layers, captures complex relationships between drilling parameters and ROP. The encoder extracts relevant information from the input time series, such as drilling conditions and operational parameters. The encoded tokens are further processed using a recent pattern window. This window considers recent historical data to enhance the model's understanding of current trends and patterns. By incorporating recent data, the model can adapt to changing conditions and improve predictive accuracy. It will be appreciated, that the splitting and encoding and 176 and 178, may advantageously improve model efficiency.

Short context, time-series data may be evaluated at 180, for example, to focus the trained encoder and decoder on the most recent window (subsequence). The trained and focused decoder may then be applied to entire input history (the short context and historical data) to predict the ROP at 182. The prediction is intended to capture (or balance) both short and long-term relationships between the drilling data in the ROP and thereby provide a more accurate ROP prediction. The ROP prediction may be output and optionally scaled 184. ROP trends may be further analyzed, for example, by a drilling operator or a software routine at 186. The ROP forecasting may be repeated as indicated at the selected time window/interval (in 174) while drilling to forecast and optimize the ROP during the drilling operation.

The disclosed embodiments are described in more detail by way of the following non-limiting example implementation. In this particular example implementation, the above described first and second architectures (the encoder and decoder) were applied to publicly available drilling data from FORGE wells 58-32 by Nash et al. (2018), 56-32 by Bristol et al. (2021), 78B-32 by McLennan et al. (2021), and 16A(78)-32 by McLennan et al. (2021). The data included drilling parameters such as depth, flowrate, pressure, temperature, torque, WOB, and RPM from the drilling process. Well 58-32 was a pilot well, reaching a depth of 7,536 feet. Well 56-32 was a seismic monitoring well, reaching a depth of 9,145 feet. Well 78B-32 was a seismic monitoring well, reaching a depth of 9,500 feet. Well 16A(78)-32 was a highly deviated injection well, reaching a depth of 10,987 feet.

Figure 7:
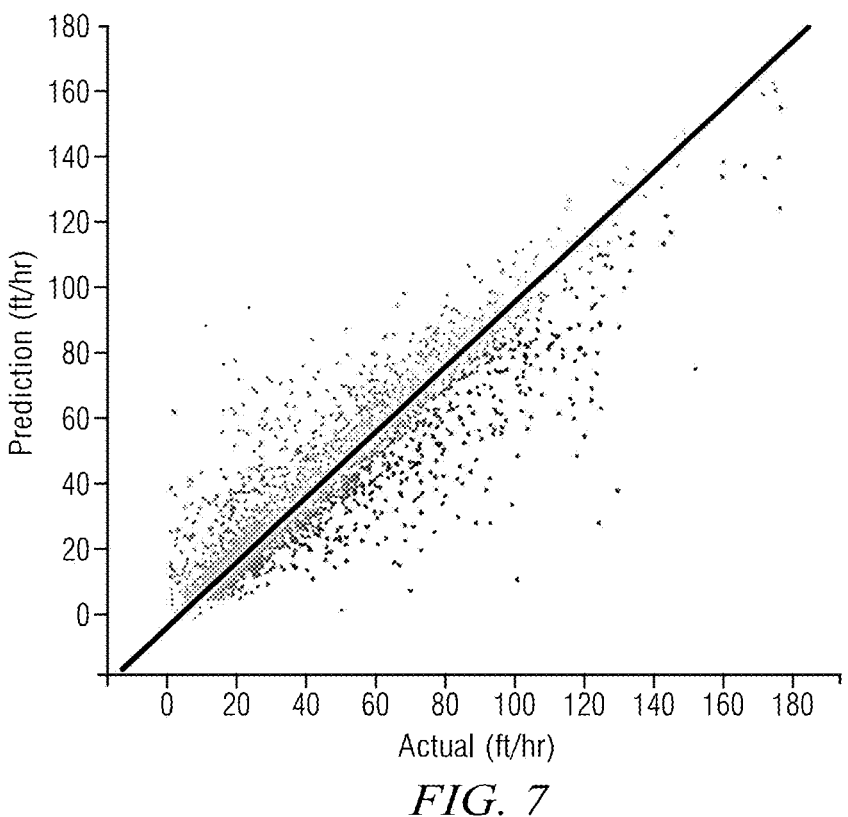
FIG. 7 depicts a plot of the predicted ROP versus the actual ROP.

FIG. 7 depicts a plot of the predicted ROP versus the actual ROP along with an error representation across all wells. The plot demonstrates the comparison between the predicted and actual ROP values for all wells. It is evident that the model predictions closely align with the actual ROP measurements, indicating the model accuracy in capturing the complex relationships between drilling operational parameters and ROP. The transformer regression (the first architecture or encoder) had a Mean Absolute Percentage Error (MAPE) of 22.4%, which is 80.2% better than previous random forest models. The depicted ROP prediction errors show that in this example the error is directly proportional to ROP and that higher ROP values may be more difficult to predict.

Figure 8:
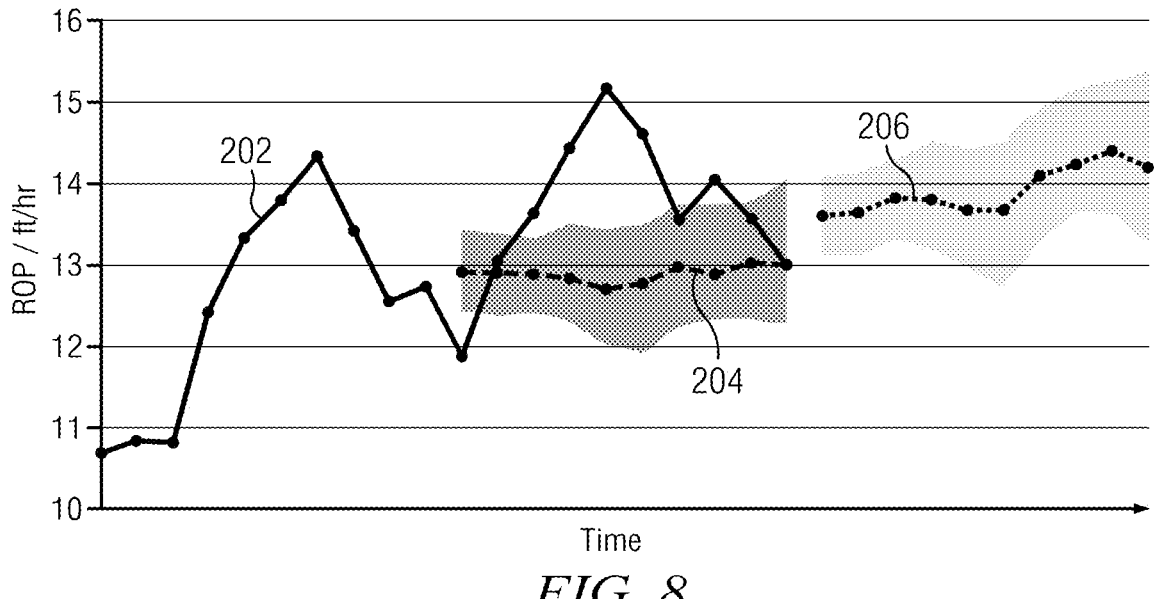
FIG. 8 depicts a plot of ROP versus time illustrating an example of the performance from the disclosed transformer-based ROP forecast model.

FIG. 8 depicts a plot of ROP versus time that illustrates the performance of the ROP forecaster for four FORGE wells. The plot includes several elements that enhance the understanding of the data. The black solid line 202 represents the actual ROP values, providing a reference for the ground truth. The black dashed line 204 corresponds to the backtest, which represents the model's predictions, and is accompanied by a gray shading indicating the 0.1 to 0.9 prediction interval. Similarly, the black dotted line 206 represents the forecast (prediction) generated by the transformer-based forecaster, and a lighter gray shading that denotes the corresponding prediction interval. FIG. 8 showcases the ability of the transformer-based ROP forecast model to capture trends and repeating patterns present in the ROP data. By successfully identifying and incorporating these patterns, the model may accurately predict future ROP values with a time horizon of 10 minutes and achieve a Symmetric Mean Absolute Percentage Error (SMAPE) of 7.3%.

The performance of the transformer-based forecast model was compared to the performances of other ROP forecast models across all four FORGE wells. The comparison is shown in Table 1, which includes error scores for various metrics, including MASE (Mean Absolute Scaled Error), SMAPE, MSE (Mean Squared Error), and RMSE (Root Mean Squared Error). The evaluated forecaster architectures include AutoARIMA, a model selection method based on automated ARIMA; Simple Feed Forward, a basic neural network architecture suitable for regression and classification tasks; DeepAR, a probabilistic forecasting algorithm leveraging LSTM to provide uncertainty estimates; and MQ-CNN, which combines convolutional neural network (CNN) and quantile regression for simultaneous estimation of multiple quantiles in time series forecasting. The results showcased in Table 1 highlight the superior performance of the disclosed transformer-based encoder in comparison to the other deep learning forecasters tested. The low error values achieved by the transformer-based forecaster indicate its effectiveness in accurately predicting future ROP trends, surpassing all other evaluated models.

TABLE 1

| Model | MASE | SMAPE | MSE | RMSE |
| --- | --- | --- | --- | --- |
| Transformer | 1.01 | 7.3% | 1.56 | 1.25 |
| AutoARIMA | 1.35 | 8.5% | 1.73 | 1.31 |
| Simple Feed Forward | 1.81 | 11.6% | 3.07 | 1.75 |
| DeepAR | 1.99 | 12.9% | 3.63 | 1.90 |
| MQ-CNN | 2.54 | 17.3% | 6.57 | 2.56 |

With reference again to FIGS. 1, 3, and 4, the trained transformer-based model may be advantageously deployed in a downhole tool located in the drill string, for example, in an MWD tool. Such deployments may advantageously provide for improved ROP forecast accuracy and a longer forecast horizon at any particular accuracy threshold. It has been observed that increasing the sampling frequency (decreasing the sampling interval) of the data in the short context, time-series data tends to improve the accuracy (e.g., reduce the MAPE) of the ROP forecast. It will be appreciated that a downhole deployment of the trained transformer-based model may enable very high data sampling rates (e.g., sampling rates on the order of one second or less or even on the order of 10 ms or less) since there is no need to transmit as the measured drilling parameters to the surface.

In one example embodiment, the trained transformer-based model may be deployed in a printed wiring assembly (PWA) in an MWD controller or otherwise stored in downhole memory and may be executed using one or more downhole processors. In such an embodiment, the short context, time-series data may advantageously include high-frequency downhole measurements, for example, including strain gauge measurements that are indicative of WOB, drill bit rotation rate measurements, differential pressure measurements, wellbore attitude measurements, downhole torque measurements, GammaRay LWD measurements, as well as downhole computed depth and ROP. Such measurements may be provided to the trained model at a high sampling frequency and may therefore provide for improved ROP forecast accuracy.

It will be understood that the present disclosure includes numerous embodiments. These embodiments include, but are not limited to, the following embodiments.

In a first embodiment, a method for forecasting a rate of penetration (ROP) while drilling a subterranean wellbore includes training a transformer-based machine learning model with historical drilling data obtained from a plurality of drilled wells to establish relationships between measured drilling parameters and ROP; acquiring short context drilling data while drilling the subterranean wellbore, the short context drilling data including a plurality of measured drilling parameters and a corresponding ROP; evaluating the short context drilling data using the trained transformer-based machine learning model to update the relationships between the measured drilling parameters and the ROP; and forecasting a future ROP using the short context drilling data and the updated relationships.

A second embodiment may include the first embodiment, further comprising adjusting one or more drilling parameters while drilling the subterranean wellbore to change the ROP, wherein the adjusting is based on the forecast future ROP.

A third embodiment may include any one of the first through second embodiments, further comprising comparing a previously forecast ROP with actual ROP measurements to backtest the transformer-based machine learning model.

A fourth embodiment may include any one of the first through third embodiments, wherein the evaluating the short context drilling data is performed using a transformer-based encoder and a feed-forward dense decoder that extracts current relationships between the measured drilling parameters and the ROP to update the relationships between the measured drilling parameters and the ROP.

A fifth embodiment may include the fourth embodiment, wherein the transformer-based encoder is configured to extract mechanical specific energy related information from the short context drilling data.

A sixth embodiment may include any one of the fourth through fifth embodiments, wherein the short context drilling data is configured and provided to the transformer-based encoder as a tensor having a preselected time window.

A seventh embodiment may include the sixth embodiment, wherein the forecasting the future ROP forecasts ROP for a future time period equal in length to the preselected time window.

An eighth embodiment may include any one of the fourth through seventh embodiments, wherein the forecasting the future ROP is performed using a transformer-based encoder and a transformer-based decoder that is configured to capture sequential patterns and establish temporal relationships between the measured drilling parameters and the ROP.

A ninth embodiments may include any one of the first through eighth embodiments, wherein the measured drilling parameters comprise at least one of standpipe pressure, a drilling fluid flow rate, rotary torque, wellbore depth, weight on bit, and a drill string or top drive rotation rate.

A tenth embodiment may include any one of the first through ninth embodiments, wherein the measured drilling parameters comprise at least one parameter combination selected from the group consisting of a sum of wellbore depth and weight on bit, a product of wellbore depth and torque, a product of differential pressure and a drilling fluid flow rate, a product of a drill string rotation rate and torque, and a product of a drill string rotation rate and differential pressure.

In an eleventh embodiment, a system for forecasting a rate of penetration (ROP) while drilling a subterranean wellbore includes a downhole tool configured for deployment in a drill string, the downhole tool including a trained transformer-based machine learning model, wherein the trained transformer-based machine learning model is trained with historical drilling data obtained from a plurality of drilled wells to establish relationships between measured drilling parameters and ROP; and a processor configured to receive short context drilling data from a plurality of downhole sensors while drilling the subterranean wellbore, the short context drilling data including a plurality of measured drilling parameters and a corresponding ROP; evaluate the short context drilling data using the trained transformer-based machine learning model to update the relationships between the measured drilling parameters and the ROP; and forecast a future ROP using the short context drilling data and the updated relationships.

A twelfth embodiment may include the eleventh embodiment, wherein the trained transformer-based machine learning model is deployed in a printed wiring assembly that is deployed in the downhole tool.

The thirteenth embodiment may include any one of the eleventh through twelfth embodiments, wherein the short context drilling data comprises time-series data having a measurement interval of less than one second.

A fourteenth embodiment may include any one of the eleventh through thirteenth embodiments, wherein the evaluate the short context drilling data is performed using a transformer-based encoder and a feed-forward dense decoder that extracts current relationships between the measured drilling parameters and the ROP to update the relationships between the measured drilling parameters and the ROP.

A fifteenth embodiment may include the fourteenth embodiment, wherein the forecast the future ROP is performed using a transformer-based encoder and a transformer-based decoder that is configured to capture sequential patterns and establish temporal relationships between the measured drilling parameters and the ROP.

In a sixteenth embodiment, a method for forecasting a rate of penetration (ROP) while drilling a subterranean wellbore includes training a transformer-based machine learning model with historical drilling data obtained from a plurality of drilled wells to establish relationships between measured drilling parameters and ROP, the training comprising evaluating the historical drilling data to identify seasonal patterns in the historical drilling data; dividing the historical drilling data into a plurality of sub-sequences based on the identified seasonal patterns; and encoding the sub-sequences as tokens using a transformer-based architecture to capture the relationships between the measured drilling parameters and the ROP and thereby obtain a trained transformer-based machine learning model; acquiring short context drilling data while drilling the subterranean wellbore, the short context drilling data including a plurality of measured drilling parameters and a corresponding ROP; evaluating the short context drilling data using the trained transformer-based machine learning model to update the relationships between the measured drilling parameters and the ROP; and forecasting a future ROP using the short context drilling data and the updated relationships.

A seventeenth embodiment may include the sixteenth embodiment, wherein the training further comprises deploying the trained transformer-based machine learning model in a downhole tool configured for deployment in a drill string.

An eighteenth embodiment may include the seventeenth embodiment, wherein the short context drilling data is acquired from a plurality of downhole sensors while drilling the subterranean wellbore.

A nineteenth embodiment include any one of the sixteenth through eighteenth embodiments, wherein the evaluating the short context drilling data is performed using a transformer-based encoder and a feed-forward dense decoder that extracts current relationships between the measured drilling parameters and the ROP to update the relationships between the measured drilling parameters and the ROP.

A twentieth embodiment may include the nineteenth embodiment, wherein the forecasting the future ROP is performed using a transformer-based encoder and a transformer-based decoder that is configured make use of the identified seasonal patterns and establish temporal relationships between the measured drilling parameters and the ROP.

Although rate of penetration forecasting while drilling using a transformer-based deep learning model has been described in detail, it should be understood that various changes, substitutions and alternations can be made herein without departing from the spirit and scope of the disclosure as defined by the appended claims.

The invention claimed is:

1. A method for forecasting a rate of penetration (ROP) while drilling a subterranean wellbore, the method comprising:

training a transformer-based machine learning model with historical drilling data obtained from a plurality of drilled wells to establish relationships between measured drilling parameters and ROP, the training comprising:

evaluating the historical drilling data to identify seasonal patterns in the historical drilling data; and dividing the historical drilling data into a plurality of sub-sequences based on the identified seasonal patterns;

acquiring short context drilling data while drilling the subterranean wellbore, the short context drilling data is used to update the relationships between the measured drilling parameters and the ROP and includes a plurality of measured drilling parameters and a corresponding ROP;

forecasting a future ROP using the short context drilling data and the updated relationships; and deploying the trained transformer-based machine learning model in a downhole tool configured for deployment in a drill string.

2. The method of claim 1, further comprising adjusting one or more drilling parameters while drilling the subterranean wellbore to change the ROP, wherein the adjusting is based on the forecast future ROP.

3. The method of claim 1, further comprising comparing a previously forecast ROP with actual ROP measurements to backtest the transformer-based machine learning model.

4. The method of claim 1, further comprising evaluating the short context drilling data is performed using a transformer-based encoder and a feed-forward dense decoder that extracts current relationships between the measured drilling parameters and the ROP to update the relationships between the measured drilling parameters and the ROP.

5. The method of claim 4, wherein the transformer-based encoder is configured to extract mechanical specific energy related information from the short context drilling data.

6. The method of claim 4, wherein the short context drilling data is configured and provided to the transformer-based encoder as a tensor having a preselected time window.

7. The method of claim 6, wherein the forecasting the future ROP forecasts ROP for a future time period equal in length to the preselected time window.

8. The method of claim 4, wherein the forecasting the future ROP is performed using a transformer-based encoder and a transformer-based decoder that is configured to capture sequential patterns and establish temporal relationships between the measured drilling parameters and the ROP.

9. The method of claim 1, wherein the measured drilling parameters comprise at least one of standpipe pressure, a drilling fluid flow rate, rotary torque, wellbore depth, weight on bit, and a drill string or top drive rotation rate.

10. The method of claim 1, wherein the measured drilling parameters comprise at least one parameter combination selected from the group consisting of a sum of wellbore depth and weight on bit, a product of wellbore depth and torque, a product of differential pressure and a drilling fluid flow rate, a product of a drill string rotation rate and torque, and a product of a drill string rotation rate and differential pressure.

11. A system for forecasting a rate of penetration (ROP) while drilling a subterranean wellbore, the system comprising:

a downhole tool configured for deployment in a drill string, the downhole tool including a trained transformer-based machine learning model, wherein the trained transformer-based machine learning model is trained with historical drilling data obtained from a plurality of drilled wells to establish relationships between measured drilling parameters and ROP, the training comprising:

evaluating the historical drilling data to identify seasonal patterns in the historical drilling data; and dividing the historical drilling data into a plurality of sub-sequences based on the identified seasonal patterns;

a processor configured to:

receive short context drilling data from a plurality of downhole sensors while drilling the subterranean wellbore, the short context drilling data including a plurality of measured drilling parameters and a corresponding ROP;

evaluate the short context drilling data using the trained transformer-based machine learning model to update the relationships between the measured drilling parameters and the ROP;

forecast a future ROP using the short context drilling data and the updated relationships; and deploy the trained transformer-based machine learning model in the downhole tool configured for deployment in the drill string.

12. The system of claim 11, wherein the trained transformer-based machine learning model is deployed in a printed wiring assembly that is deployed in the downhole tool.

13. The system of claim 11, wherein the short context drilling data comprises time-series data having a measurement interval of less than one second.

14. The system of claim 11, wherein the evaluate the short context drilling data is performed using a transformer-based encoder and a feed-forward dense decoder that extracts current relationships between the measured drilling parameters and the ROP to update the relationships between the measured drilling parameters and the ROP.

15. The system of claim 14, wherein the forecast the future ROP is performed using a transformer-based encoder and a transformer-based decoder that is configured to capture sequential patterns and establish temporal relationships between the measured drilling parameters and the ROP.

16. A method for forecasting a rate of penetration (ROP) while drilling a subterranean wellbore, the method comprising:

training a transformer-based machine learning model with historical drilling data obtained from a plurality of drilled wells to establish relationships between measured drilling parameters and ROP, the training comprising:

evaluating the historical drilling data to identify seasonal patterns in the historical drilling data;

dividing the historical drilling data into a plurality of sub-sequences based on the identified seasonal patterns; and encoding the sub-sequences as tokens using a transformer-based architecture to capture the relationships between the measured drilling parameters and the ROP and thereby obtain a trained transformer-based machine learning model;

acquiring short context drilling data while drilling the subterranean wellbore, the short context drilling data including a plurality of measured drilling parameters and a corresponding ROP;

evaluating the short context drilling data using the trained transformer-based machine learning model to update the relationships between the measured drilling parameters and the ROP;

forecasting a future ROP using the short context drilling data and the updated relationships; and deploying the trained transformer-based machine learning model in a downhole tool configured for deployment in a drill string.

17. The method of claim 16, wherein the short context drilling data is acquired from a plurality of downhole sensors while drilling the subterranean wellbore.

18. The method of claim 16, wherein the evaluating the short context drilling data is performed using a transformer-based encoder and a feed-forward dense decoder that extracts current relationships between the measured drilling parameters and the ROP to update the relationships between the measured drilling parameters and the ROP.

19. The method of claim 18, wherein the forecasting the future ROP is performed using a transformer-based encoder and a transformer-based decoder that is configured make use of the identified seasonal patterns and establish temporal relationships between the measured drilling parameters and the ROP.

* * * * *